M. L. SEVERY.
MEANS FOR UTILIZING SOLAR HEAT.
APPLICATION FILED MAR. 4, 1898. RENEWED FEB. 29, 1908.

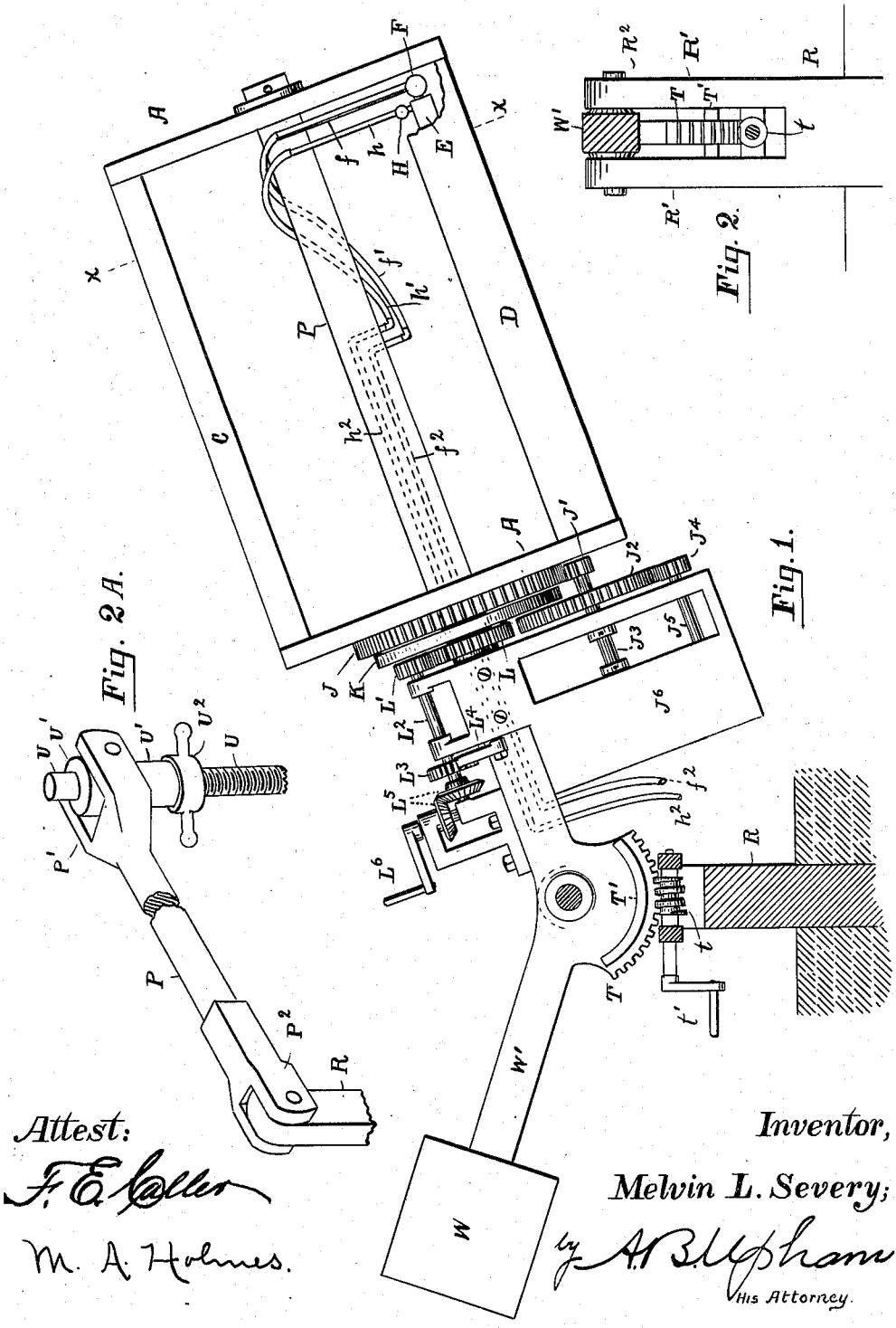

937,013.

Patented Oct. 12, 1909.
3 SHEETS—SHEET 3.

Attest:
F. E. Culler
M. A. Holmes.

Inventor,
Melvin L. Severy;
by F. A. B. Upham,
His Attorney.

UNITED STATES PATENT OFFICE.

MELVIN L. SEVERY, OF ARLINGTON HEIGHTS, MASSACHUSETTS.

MEANS FOR UTILIZING SOLAR HEAT.

937,013. Specification of Letters Patent. Patented Oct. 12, 1909.

Application filed March 4, 1898, Serial No. 672,491. Renewed February 29, 1908. Serial No. 418,566.

*To all whom it may concern:*

Be it known that I, MELVIN L. SEVERY, a citizen of the United States, and residing at Arlington Heights, in the county of Middlesex and State of Massachusetts, have invented a new and useful Means for Utilizing Solar Heat, of which the following is a full, clear, and exact description.

The object of this invention is the construction of improved means for utilizing radiant heat from the sun by concentrating it upon the object to be acted upon thermally. In previous devices for thus concentrating the solar rays, various forms of reflecting surfaces have been employed. In one form, silvered glass of the usual mirror variety has been used; but on account of the rapid crystallization and deterioration of the silvered backing, these do not prove commercially economical. Other inventors have utilized highly polished surface of German silver, and similar materials, which did not thus deteriorate. But as these reflecting surfaces have been metallic and quick to tarnish and become inefficient, the labor of polishing them has strongly detracted from their utility.

My invention relates to means whereby a heat-concentrating medium can be employed which shall be incapable of tarnishing; and also to certain improvements in construction and detail of the general mechanism for utilizing the same.

Figure 3:
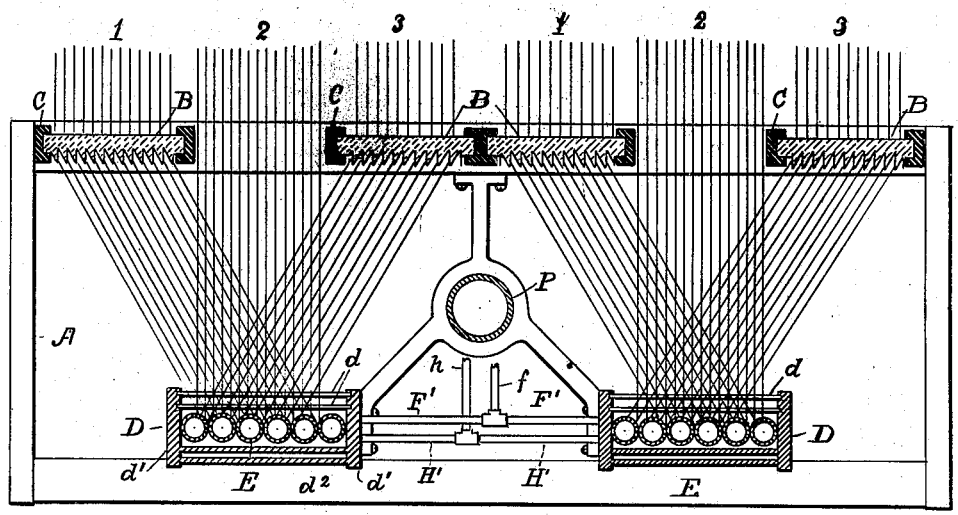
Figure 4:
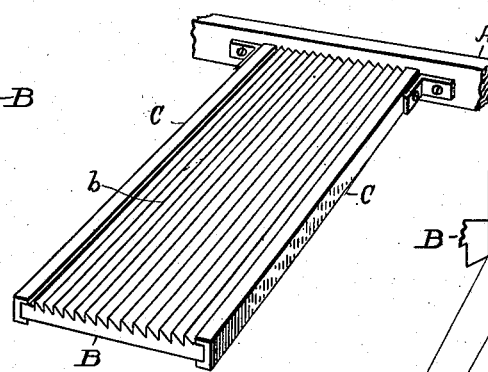
Figure 13:
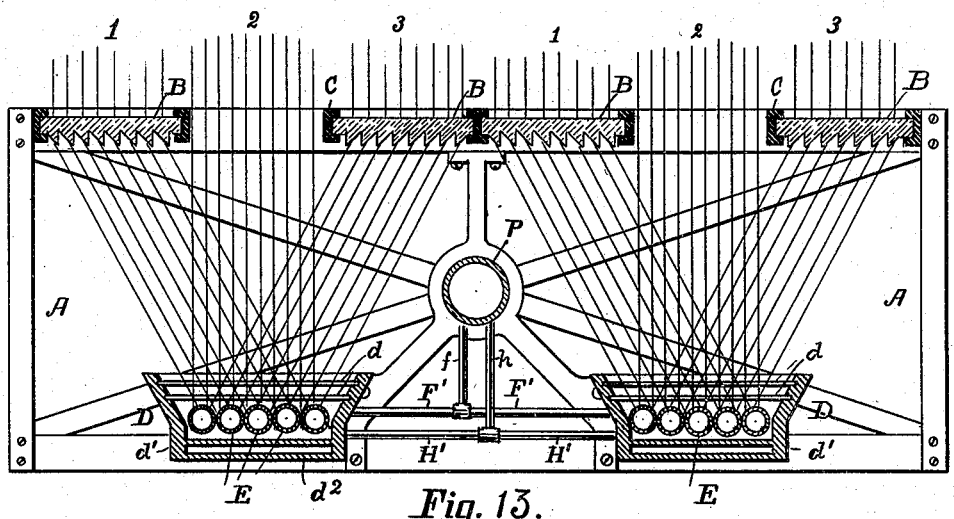
Figure 11:
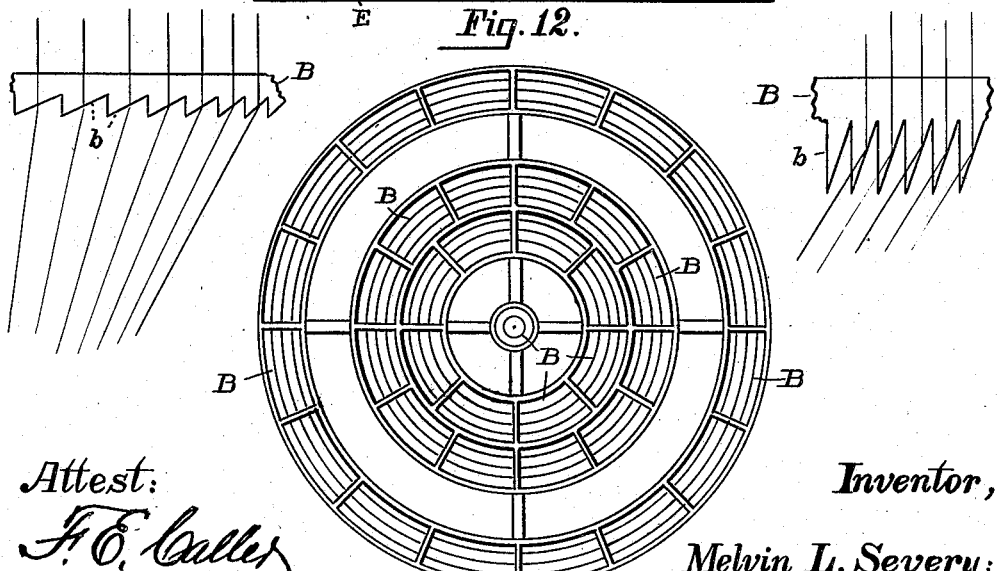

Referring to the drawings forming part of this specification, Figure 1 is a side view of the general mechanism; Fig. 2 is a detail view of the supporting post; Fig. 2$^A$ is a perspective view of a modification of the spindle supporting and adjusting arrangement; Figs. 3 and 13 are substantially similar views in cross section at X X in Fig. 1; Fig. 4 is a perspective view of one of the prismatic plates; Figs. 5, 6, 7, 8, 9 and 10 are diagrammatic modified forms of said plate; Fig. 11 is a plan view of a modification of the heat concentrating plates; Fig. 12 is a perspective cross section of the same.

The heat-gathering device and the boiler containing the agent to be acted upon by the heat are supported by the frame-work, A; and in order to constantly present the same to the full effect of the sun's rays, said frame is mounted upon the tubular spindle, P, which in its turn is pivotally held by the split post, R. Said spindle is adjusted, to allow for the declination of the sun and to bring its plane perpendicular to the sun's rays, by means of the toothed segment, T, acted upon by the worm, t, through the agency of the crank-handle, t'. Said segment and also the spindle, P, and arm, W', are joined rigidly together; and said arm carries the counter weight, W, which by counter balancing the parts carried on the said spindle, reduces the strain upon the post, R, and the power required for turning the worm, t.

To keep the face of the heat-gathering apparatus constantly presented to the sun during its diurnal motion,—in other words, to properly orient it,—it must revolve upon the spindle, P, during the hours of the day through about 180 degrees. This I accomplish by the following mechanism. Fixed to the frame, A, is a large gear wheel, J, with which meshes the pinion, J', carried on the shaft, J$^3$. In the case J$^6$ is supposed to be a regulating device, or escapement, connected through the shaft, J$^5$, pinion, J$^4$, and gear wheel, J$^2$, to said shaft, J$^3$; and by means of which the frame, A, is prevented from turning faster than 15 degrees per hour. To turn the frame, I furnish the strong coiled spring, K, one end of which is attached to the gear wheel, J, and the other to the gear wheel, L, which is loosely mounted upon the spindle, P. Meshing with said gear, L, is a pinion, L', fixed upon the shaft, L$^2$. By means of the crank-handle, L$^6$, and bevel gears, L$^5$, said shaft and consequently the gear wheel, L, can be forcibly turned and the spring, K, wound up thereby. The ratchet wheel, L$^3$, fixed on the shaft, L$^2$, and the pawl, L$^4$, engaging with said ratchet wheel, holds said spring in its wound condition. By the arrangement thus described, the rotation of the heat-gathering apparatus can be continued both day and night, each morning seeing the same at the proper angle for receiving the sun's rays squarely upon its face. I prefer, however, to have the motion of the apparatus continued simply through the day, and to turn it back to the proper angle after each partial rotation. To do this, the pinion, J', is loosely keyed upon the shaft, J$^3$, and is slipped along said shaft out of mesh with the gear wheel, J, when it is wished to turn the frame back to its initial position, which is done by the attendant's applying the required force to the frame itself and moving it as desired.

As shown more clearly in Fig. 2, the post,

R, is split for the reception of the toothed segment, T, and to form suitable bearings for the pivot-trunnions, R², thereof. To more securely hold the said segment and prevent it from vibrating, I form it with the ribs, T', curved concentric with the axle, R², and fitting snugly between the post-bifurcations, R'.

Referring, now, to Fig. 3, in which A is the frame, and P, the supporting spindle therefor, as already described; E, E, represent in section the two tubular boilers which I design to employ, and which are located in the jackets, D, comprising the sides, d', double walled back, d², and double walled, transparent front, d. By having the jacket-front transparent, the luminous heat penetrates unimpeded through the same and is converted into dark heat by its impact upon the blackened boiler tubes. Said transparent front is made double in order the better to prevent the escape of the heat thus bottled up therein. It will further be seen that I provide my solar engine with duplicate boilers and heat-gathering apparatus, one set balancing the other upon the spindle, P. This enables me to secure considerably more power for the same weight of apparatus than if the same were not thus duplicate. The reason for this will be partially evident upon inspection of Fig. 3, where it will be seen that the spindle, P, which must necessarily be large and strong in order to sustain the apparatus firmly and steadily even in a heavy wind, is so located as to not interfere with the solar rays being deflected upon the boilers; said rays being represented by the lines 1, 2 and 3. For, should the apparatus be single instead of duplicate, said spindle would require to be located directly in the path of the solar rays, 2, and thereby diminish the effectiveness of the solar engine by fully one fourth, even should the boiler and other apparatus be broadened to equal the total of the double surfaces. Moreover, to thus broaden the thermal surface would also require the deepening of the apparatus; in other words, the lengthening of the distance between the heat-gathering plates, B, and the boiler; for the reason that to produce a more pronounced divergence of the solar rays in order to superimpose them upon the boiler would pass the limit of economical refraction. Such enlargement of the frame work would, of course, give greater wind-resistance, cause the loss of more power in orienting the same, be more difficult to transport, and in other ways be objectionable. At the upper ends of the boiler tubes, E, is a transverse pipe, or steam dome, F, communicating with each of said tubes, said steam domes being connected by the union-pipe, F'. Joined to said union-pipe, F', is an arm, f, extending over to the spindle, P, where it is suitably supported and made to terminate in the flexible section of tubing, f'. See Fig. 1. Within the hollow spindle, P, is the steam pipe, f², reaching diametrically outward through the said spindle both at the lower end of the same and also at a point at which it can be conveniently joined to the said flexible section, f'. The end of said steam pipe, f², connects with the motor engine to be driven by the steam or other fluid issuing therefrom, which engine does not, of course, need to be shown. The object of the said flexible section is to permit of the oscillation of the frame, A, in the orienting required by the heat-gathering apparatus. In the same manner, the water-injecting tube, h², is connected with the boiler-tubes, E; the flexible section, h', inward reaching arm, h, section, H', and tube, H, joining said tube, h², to each of said boiler tubes E.

Figure 5:
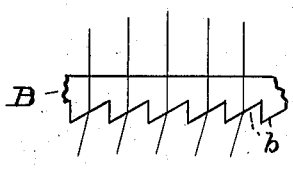

My means for collecting and superimposing the sun's rays upon each of the boilers consists essentially of a transparent plate, B, formed with prismatic ridges of such a formation as to deflect to the boiler the heat rays which would otherwise pass to one side thereof. This deflection I accomplish in two ways. The first is that of refraction, as illustrated in Figs. 5, 6, 7, 8 and 9. As indicated in Fig. 5, each of said ridges, b, is given an angle of refraction just sufficient to deflect to the boiler the solar rays passing through them. In this case, the emerging rays all issue parallel and strike a surface upon the boiler equal in width to the plate, B, itself; while the outer face of the plate is perfectly plane, and can be easily cleansed from accumulating dust.

Figure 6:
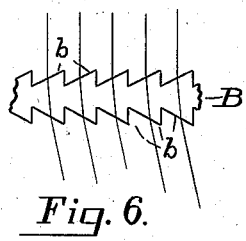
Figure 7:
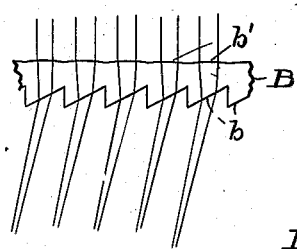

In Fig. 6, is shown a form of plate in which the refracting ridges are formed upon each side thereof. Fig. 7 shows a form of such plate in which the under side of the same is provided with refracting prisms or ridges, while the upper surface is given a series of slight ridges, b', of convex curvature, one for each ridge, b, the center of curvature of each of which is adapted to concentrate the solar rays upon an equal number of lineal points upon the boilers. These lenticular ridges serve to concentrate the heat upon each boiler-tube where it would strike the surface squarely instead of tangentially; and thus give the most economical results.

Figure 8:
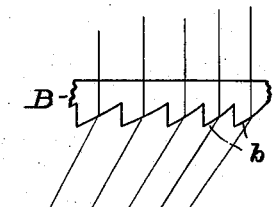
Figures 9, 10, 12:
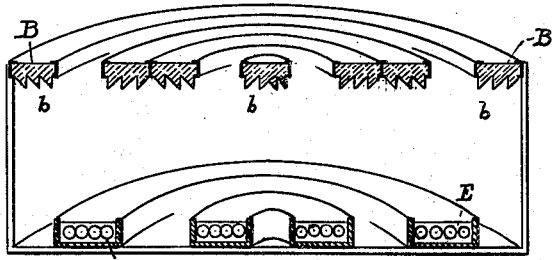

Fig. 8 shows a form of refraction ridge in which the issuing rays are concentrated upon a surface less in width than the plate itself; and said figure also illustrates an arrangement of the boiler tubes in which they are nested into a space less in width than that they would otherwise occupy, and yet permit each tube to receive the refracted rays upon a portion of its surface. Fig. 9 illustrates substantially the same construction as Fig. 8, the only difference consisting in making the refracting surfaces plane in Fig. 9, and curved in Fig. 8, said curvature serving the same purpose as the auxiliary curved surfaces, b', shown in Fig. 7.

Thus far I have described only refracting surfaces as being the means for deflecting the solar rays passing through the striated plates, B. While these are the most practical for general construction, I also design to form said plates with surfaces adapted to reflect the light to the boilers, instead of refracting it. Such reflecting surfaces are illustrated in Figs. 10 and 3. Fig. 10 shows how the rays of light impinging upon the oblique surface of each prismatic ridge are reflected at the proper angle to escape the ridge next thereto and reach the boiler; while Fig. 3 shows the complete apparatus and boilers, not materially differing otherwise from the construction illustrated in Fig. 13. In order that there shall thus be the complete internal reflection required to deflect to the boilers the thermal rays striking the striated plate, the angle of each ridge in cross section must be made so sharp as to greatly endanger their permanence when in use, any chance blow being very apt to fracture and ruin more or less of their sharply projecting edges.

As will be evident from inspection of Figs. 3 and 13, each boiler, E, is located behind the space separating the two striated plates, B, and such distance of separation is made equal to the width of the boiler. Hence, the solar rays, 2, have uninterrupted passage directly to the surface of the boiler; while the said plates serve to deflect to the boiler the rays, 1 and 3, which would otherwise pass beside it. Thus each boiler will have superimposed thereon three distinct sets of solar rays, and is heated to a degree much greater than that it would reach if receiving but the direct rays alone. I have shown plates, B, as each about equal in width to the boiler, thus only triplicating the heat deflected thereto; but as shown in the constructions illustrated in Figs. 8 and 9, said plates can be much wider than the boiler, and the heat concentrated upon the latter may be quadrupled or even sextupled above the normal capacity of the sun's rays.

In Figs. 11 and 12 is illustrated a modification of my arrangement of the deflecting plates and boilers. Instead of being rectangular in outline, the plates may be disposed in a series of concentric circles; with the boiler tubes coiled beneath, as shown in section in Fig. 12. The boiler tubes are placed beneath the open spaces between the circles of deflecting plates, and the latter provided with prismatic ridges for refracting the solar rays upon the tubes, precisely as in the constructions previously described.

As a modification of my counter-weighted spindle, P, adjusted by means of the toothed segment, T, and worm, t, to accommodate the declination of the sun, I show in Fig. 2$^A$, a construction in which the said spindle is pivoted to the post, R, as before, but the outer end is positively supported by an adjustable prop, U', whose lower end is supposed to be anchored to the ground. More or less of said prop is screw-threaded to fit the nut, U$^2$, which couples to the collar, U', trunnioned in the forks, P', of the spindle, P, whose other end is forked, as P$^2$, to clasp the post, R, pivoted therein. Although the spring, K, is supposed to be wound by hand through the crank and gears illustrated, there is nothing to prevent its being kept in a state of tension automatically by means of the motor machinery, as in any of the several ways shown in previous patents.

What I claim as my invention and desire to secure by Letters Patent is as follows, to wit:—

1. The combination with a flatly extended frame supported in a plane transverse to the sun's rays, of a set of prismatic refractors carried by said frame in its own plane, and a flatly extended boiler fixed in relation to said frame a short distance behind the same and parallel therewith, with its nearest side in the foci of said prisms, substantially as described.

2. The combination with a heat-receiving object, of a plurality of series of prismatic refractors located outside of the path of the rays from the sun to said object, but arranged to deflect to such object such of the sun's rays as impinge upon them.

3. The combination with a flatly extended frame lying in a plane transverse to the sun's rays, of two sets of prismatic refractors carried by said frame in its own plane, one set separated a short distance from the other, and a flatly extended boiler fixed in relation to said frame a short distance behind the same and parallel therewith with its nearest side in the foci of said prisms, whereby the maximum of solar heat can be obtained with the minimum extent and weight of apparatus.

4. In a device for utilizing solar heat, the combination of a plurality of boilers located in substantially the same plane but separated one from another, and a plurality of heat-refracting devices substantially parallel with said plane but between the same and the sun; said refracting devices being separated from each other to permit the direct rays of the sun to strike said boilers, while being themselves disposed to divert to said boilers the heat-rays striking said refracting devices.

5. In a device for utilizing solar heat, the combination of a spindle, a frame supported by said spindle, two boilers carried by said frame a substantial distance apart at the rear of and equidistant from said spindle, and four sets of refracting devices carried by said frame in advance of said boilers and spindle; said refracting devices being disposed to permit the direct rays of the sun to strike said boilers, and to refract to said boilers the rays striking said refracting devices; and the central two of said refracting devices being located in front of said spindle which is thereby kept from interference with the rays diverted by said devices to said boilers.

6. In a device for utilizing solar heat, the combination with a supporting spindle and a frame rotatable thereon, of duplicate boilers held by said frame equidistant from said spindle, and heat-refracting plates held by said frame and adapted to superimpose added heat rays upon said boilers.

7. In a device for utilizing solar heat, the combination with a supporting spindle and heat receiving and heat concentrating apparatus mounted thereon, of a gear wheel turning with said apparatus, a pinion meshing with said gear and provided with suitable speed regulating devices, a coiled spring inclosing said spindle and attached at one end to said gear wheel, a gear wheel loosely mounted on said spindle and attached to the other end of said spring means for turning the last-named gear wheel and thereby winding said spring, and a pawl for preventing the unwinding of said spring except when acting to revolve said heat receiving and concentrating apparatus.

8. The combination with a spindle and a heat utilizing apparatus oscillatory thereon, said apparatus including a boiler, of inlet and outlet pipes located in said spindle, and lengths of flexible tubing joining said pipes to said boiler.

9. In a device for utilizing solar heat, the combination of a counter-weighted spindle having means for its adjustment in declination, a frame rotatable on said spindle and provided with timed means for its rotation, a series of flat, transparent plates carried by said frame at one side thereof, said plates having parallel ray-deflecting ridges, jacketed boilers carried at the side of said frame opposite to and parallel with said deflecting plates, and pipes connecting said boilers with the desired external object and adapted not to interfere with the motions of said frame.

10. A solar device consisting of a heat receiver adapted to absorb the direct rays of the sun, and refracting devices located outside the path of the sun's rays to said receiver and adapted to focus or superimpose upon said receiver the solar rays impinging upon said devices.

In testimony that I claim the foregoing invention I have hereunto set my hand this 3rd. day of March, 1898.

MELVIN L. SEVERY.

Witnesses:
F. E. CALLER,
A. B. UPHAM.